US010081062B2

United States Patent
Hoop

(10) Patent No.: US 10,081,062 B2
(45) Date of Patent: Sep. 25, 2018

(54) CUTTING PORTION FOR A DRILL BIT

(71) Applicant: Hilti Aktiengesellschaft, Schaan (LI)

(72) Inventor: Matthaeus Hoop, Eschen (LI)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 14/654,456

(22) PCT Filed: Dec. 20, 2013

(86) PCT No.: PCT/EP2013/077684
§ 371 (c)(1),
(2) Date: Jun. 19, 2015

(87) PCT Pub. No.: WO2014/096359
PCT Pub. Date: Jun. 26, 2014

(65) Prior Publication Data
US 2015/0343539 A1    Dec. 3, 2015

(30) Foreign Application Priority Data

Dec. 21, 2012   (WO) ................. PCT/EP2012/076774
May 8, 2013   (EP) ..................................... 13166989

(51) Int. Cl.
*B23B 51/04*   (2006.01)
*B23B 31/113*   (2006.01)
(Continued)

(52) U.S. Cl.
CPC ........ *B23B 31/113* (2013.01); *B23B 51/0406* (2013.01); *B28D 1/041* (2013.01);
(Continued)

(58) Field of Classification Search
CPC ............... B23B 31/113; B23B 51/0406; B23B 2240/04; B23B 2251/02; B28D 1/046; Y10T 408/895
See application file for complete search history.

(56) References Cited

U.S. PATENT DOCUMENTS 58,924 A * 10/1866 Webster .................. B23B 51/05
                                                                    408/112
308,842 A * 12/1884 Hunt ....................... B23B 51/05
                                                                    279/93
(Continued)

FOREIGN PATENT DOCUMENTS

DE    196 54 597 A1    6/1998
DE    103 57 505 A1    5/2005
(Continued)

OTHER PUBLICATIONS

PCT/EP2013/077684, International Search Report (PCT/ISA/210) dated Apr. 14, 2014, with partial English translation, enclosing Written Opinion of the International Searching Authority (PCT/ISA/237) (Fifteen (15) pages).

(Continued)

*Primary Examiner* — Daniel Howell
*Assistant Examiner* — Paul M Janeski
(74) *Attorney, Agent, or Firm* — Crowell & Moring LLP

(57) ABSTRACT

A cutting portion, which is rotatable in a direction of rotation about an axis of rotation, is disclosed. The cutting portion has an annular portion, one or more cutting elements which are disposed on a first end of the annular portion, and an insertion element which is disposed on the annular portion at an end that is remote from the cutting elements. The insertion element has at least one slit-shaped clearance with a cross-slit and a connecting slit, where the cross-slit is arranged perpendicularly in relation to the axis of rotation and is connected by way of the connecting slit to an upper edge of the insertion element.

15 Claims, 5 Drawing Sheets

(51) Int. Cl.
*E21B 17/046* (2006.01)
*B28D 1/04* (2006.01)

(52) U.S. Cl.
CPC ........ *E21B 17/046* (2013.01); *B23B 2240/04* (2013.01); *B23B 2251/02* (2013.01); *Y10T 408/895* (2015.01)

(56) References Cited

U.S. PATENT DOCUMENTS

| | | | | |
|---|---|---|---|---|
| 2,015,339 | A | * | 9/1935 | Ellingham .......... B23B 51/0406 408/199 |
| 3,331,455 | A | * | 7/1967 | Anderson, Jr. ..... B23B 51/0406 175/386 |
| 3,374,696 | A | * | 3/1968 | Trevathan .......... B23B 51/0406 408/204 |
| 3,888,320 | A | | 6/1975 | Maxwell |
| 4,941,783 | A | * | 7/1990 | Maier .................... B28D 1/041 175/403 |
| 5,865,571 | A | * | 2/1999 | Tankala ................ B23B 31/005 408/1 R |
| 2005/0105981 | A1 | * | 5/2005 | Byrley ................ B23B 51/0406 408/204 |
| 2005/0279533 | A1 | | 12/2005 | Corica |
| 2007/0020056 | A1 | | 1/2007 | Burdick |
| 2010/0200304 | A1 | | 8/2010 | Gosamo et al. |

FOREIGN PATENT DOCUMENTS

| | | |
|---|---|---|
| EP | 0 477 253 B1 | 4/1992 |
| EP | 0 909 870 A1 | 4/1999 |
| JP | 59-105311 U | 7/1984 |
| JP | 6-257370 A | 9/1994 |
| JP | 2001-3673 A | 1/2001 |
| JP | 2002-120218 A | 4/2002 |
| JP | 2005-290807 A | 10/2005 |
| JP | 2010-236323 A | 10/2010 |
| KR | 10-2005-0034151 A | 4/2005 |
| SU | 1614917 A1 | 12/1990 |
| WO | WO 90/15683 A1 | 12/1990 |

OTHER PUBLICATIONS

European Search Report dated Apr. 4, 2014, with Statement of Relevancy (Four (4) pages).
U.S. Patent Application, "Drill Bit with an Exchangeable Cutting Portion", U.S. Appl. No. 14/654,459, filed Jun. 19, 2015, Inventor Matthaeus Hoop.
U.S. Patent Application, "Drill Bit with an Exchangeable Cutting Portion", U.S. Appl. No. 14/654,461, filed Jun. 19, 2015, Inventor Matthaeus Hoop et al.
English-language translation of Japanese Office Action issued in counterpart Japanese Application No. 2015-548631 dated Jul. 13, 2016 (four (4) pages).
Translation of Korean Office Action issued in counterpart Korean Application No. 10-2015-7018271 dated Jun. 20, 2016 (nine (9) pages).
Russian Search Report issued in counterpart Russian Application No. 2015129608/02(045669) dated Aug. 8, 2016 with partial English translation (three pages).
English translation of Japanese-language Office Action issued in counterpart Japanese Application No. 2015-548631 dated Mar. 29, 2017 (2 pages).

* cited by examiner

CUTTING PORTION FOR A DRILL BIT

This application claims the priority of International Application No. PCT/EP2013/0077684, filed Dec. 20, 2013, PCT/EP2012/076774, filed Dec. 21, 2012, and European Patent Document No. 13166989.7, filed May 8, 2013, the disclosures of which are expressly incorporated by reference herein.

BACKGROUND AND SUMMARY OF THE INVENTION

The present invention relates to a cutting portion for a drill bit.

U.S. Pat. No. 3,888,320 A discloses a cutting portion that is connectable to a drill bit via a detachable plug-and-twist connection to a drill shaft portion. The drill bit is attached in the tool receptacle of a core drilling device and, during drilling, driven by the core drilling device in a rotational direction around an axis of rotation. The cutting portion comprises an annular portion, a plurality of cutting elements connected on a first end to the annular portion, and an outer insertion element that is connected on a second end facing away from the cutting elements to the annular portion. The drill shaft portion comprises a cylindrical drill shaft having an inner insertion element on one end facing the cutting portion. The inner and outer insertion elements form a plug connection in an insertion direction parallel to the axis of rotation. The outer insertion element comprises a plurality of pin elements on its interior that are directed radially inward in a plane perpendicular to the axis of rotation. The inner insertion element comprises a plurality of slit-shaped clearances in the shape of an L into which the pin elements are inserted. The L-shaped clearances comprise a transverse slit running perpendicular to the axis of rotation and a connector slit that runs parallel to the axis of rotation and connects the transverse slit to a lower edge of the inner insertion element. The insertion element of the drill shaft portion is designed in an open fashion in the region of the connector slits. The pin elements that are attached to the cutting portion are inserted via the connector slit.

One disadvantage of the known cutting portion may be seen when the cutting portion has become jammed in the substrate. In core drilling, it is common for the cutting section to become jammed in the substrate during drilling and need to be removed by the operator. In stand-guided core drilling devices, in order to remove a jammed cutting section, the drill bit is driven opposite the rotational direction and the drill stand exerts a tensile force on the drill bit directed opposite the drilling direction. The operator attempts to free the cutting portion from the substrate by manually rotating it with the aid of a tool key and, at the same time, pulling with the aid of the drill stand. The L-shaped clearances of the known cutting portion present the risk that the operator will rotate the drill shaft portion around the axis of rotation until the pin element comes into contact with the connector slit and, at the same time, operate the handwheel of the drill stand, such that the pin element is moved out of the connector slit. As soon as the plug-and-twist connection between the cutting portion and the drill shaft portion has been opened, the cutting portion must be freed from the substrate in another manner, for example, by the removal of the substrate.

The object of the present invention is to develop an exchangeable cutting portion for a drill bit in which the risk is reduced of the connection accidentally being opened during the removal of a jammed drill bit from the substrate and the drill shaft portion being removed from the substrate without the cutting portion. In addition, the stability of the cutting portion during drilling and the ability of the cutting portion to withstand tensile force exerted by a drill stand should be increased.

Provision is made according to the invention for the insertion element to comprise at least one slit-shaped clearance having a transverse slit and a connector slit, with the transverse slit being disposed perpendicular to the axis of rotation and being connected via the connector slits to an upper edge of the insertion element. The insertion element of the cutting portion is designed in an open fashion in the region of the connector slits. The pin elements that are attached to the drill shaft portion are inserted via the connector slit; the connector slit may be disposed parallel or at an oblique angle to the axis of rotation. The transmission of torque from the pin elements to the plug element occurs in the transverse slit.

The drill bit segments comprising the slit-shaped clearances is more susceptible to deformation by tensile force than the drill bit segment to which the pin elements are attached. The arrangement of the slit-shaped clearances on the exchangeable cutting portion has the advantage that the less stable drill bit segment is exchanged. The cutting portion according to the invention has a higher degree of stability and ability to withstand tensile force.

It is preferable for the insertion element to comprise three or more slit-shaped clearances. Here, the slit-shaped clearances are preferably evenly distributed around the axis of rotation of the cutting portion. Due to the even distribution of the slit-shaped clearances, it is not necessary to assign pin elements to clearances, and a pin element may be inserted into any clearance.

In a preferred embodiment, the insertion element has an outer and inner diameter perpendicular to the axis of rotation and extends parallel to the axis of rotation over a length. The annular insertion element allows the formation of a plug connection with an inner insertion element and an outer insertion element. The inner insertion element is preferably provided on the drill shaft portion and the outer insertion element on the cutting portion. Due to the arrangement of the slit-shaped clearances on the outer insertion element and the arrangement of the pin elements on the inner insertion element, the drill bit can be designed in a watertight fashion on the inside and the misdirection of a cooling and rinsing medium can be prevented. When a drill bit is watertight, all of the cooling and rinsing medium is supplied, for example, via the insertion end of the drill bit, to the work surface and ensures the cooling of the cutting elements and the removal of drillings. The cutting portion according to the invention also allows the operator to monitor the opening and closing of the plug-and-twist connection. This monitoring is not possible or is possible only to a limited degree if the slit-shaped clearances are provided on the inner insertion element.

It is particularly preferred for the length of the insertion element to be at least 18 mm. At a minimum length of 18 mm for the insertion element, sufficient ability to withstand force is ensured for the cutting portion. The slit-shaped clearances may be positioned on the insertion element at such a height that the cutting portion is able to withstand tensile forces that occur during the removal of a jammed drill bit with the aid of a drill stand.

Here, it is particularly preferred for the length of the insertion element not to exceed 28 mm. Up to an insertion element length of 28 mm, the ability of the insertion element to withstand tensile force is improved. Greater insertion element lengths have no or very little influence on the ability of the cutting portion to withstand tensile force and only incur increased material and manufacturing costs.

It is preferable for the transverse slit parallel to the axis of rotation to have a lower distance from the annular portion of at least 3 mm. A minimum distance of 3 mm guarantees a sufficient ability on the part of the cutting portion to withstand tensile force during the removal of a jammed drill bit with the aid of a drill stand.

Here, it is particularly preferred for the lower distance from the transverse slit to the annular portion not to exceed 5 mm. Up to a distance of 5 mm, the ability of the cutting portion to withstand tensile force is improved. Greater distances have no or very little influence on the ability of the cutting portion to withstand tensile force and only incur increased material and manufacturing costs.

In a refinement of the cutting portion, the transverse slit comprises a catching region and a locking region, with the catching region being connected to the connector slit on a side of the connector slit facing the rotational direction and the locking region being connected to the connector slit on a side of the connector slit opposite the rotational direction. The transmission of torque from the drill shaft portion onto the cutting portion occurs via the pin elements and the catching region. The locking region is disposed on the side of the connector slit opposite the catching region. The locking region reduces the risk of the plug-and-twist connection between the drill shaft portion and the cutting portion being unintentionally opened during the release of a jammed cutting portion from the substrate. The operator attempts to free the jammed cutting portion from the substrate by rotating the drill shaft portion around the axis of rotation with the aid of a tool key and, at the same time, pulling it with the aid of the drill stand. Practical experience has shown that operators primarily pull on the drill shaft portion when the pin element is resting against the transverse slit. When the pin element is resting against the catching region or the locking region, there is no risk that the plug-and-twist connection will be opened. In the cutting portion according to the invention, the plug-and-twist connection will be opened only if the operator pulls on the drill shaft portion at the precise moment at which the pin element is located over the connector slit. The risk of unintentionally opening the plug-and-twist connection is considerably reduced as compared to slit-shaped clearances in the shape of an L.

In a first preferred variant, the width of the catching region and the width of the locking region coincide. Here, the catching region and locking region preferably have a minimum width of the pin radius plus 1.5 mm and a maximum width of the pin radius plus 3 mm. This embodiment is particularly advantageous for cutting portions with large diameters, in which the proportion of the circumference occupied by transverse slits is small.

In a second preferred variant, the width of the catching region is greater than the width of the locking region. Here, the catching region and the locking region preferably have a minimum width of the pin radius plus 1.5 mm and a maximum width of the pin radius plus 3 mm. This embodiment is particularly advantageous for cutting portions with small diameters, in which the proportion of the circumference occupied by transverse slits is large.

It is preferred for the height of the connector slit parallel to the axis of rotation of the cutting portion to be at least 10 mm. At a height of at least 10 mm, sufficient ability by the cutting portion to withstand tensile force exerted by a drill stand is ensured.

Here, it is particularly preferred for the height of the connector slit parallel to the axis of rotation not to exceed 13 mm. Up to a height of 13 mm, the ability of the cutting portion to withstand tensile force exerted by a drill stand is improved. Greater heights have no or very little influence on the ability of the cutting portion to withstand tensile force exerted by a drill stand and only incur increased material and manufacturing costs.

In a refinement of the cutting portion, the annular portion comprises a guide portion, with the guide portion being flush to an outer edge, an inner edge, or to an outer edge and an inner edge of the cutting elements parallel to the axis of rotation. Due to the flush connection of the guide portion to the cutting elements, the guide portion forms a guide for the cutting elements during drilling and stabilizes the cutting elements. Here, guidance may occur on the outside of the cutting portion via the substrate surrounding the drill bore or on the inside of the cutting portion via the drill core.

It is preferable for the length of the guide portion parallel to the axis of rotation to be less than 4 mm. A guide portion that is less than 4 mm does not impede the supply of a cooling and rinsing medium, or does not do so to a substantial degree.

In a preferred embodiment of the cutting portion, the outer insertion element comprises a groove disposed in the axial direction at the height of the slit-shaped clearances. An "axial direction" is defined as a direction parallel to the axis of rotation of the cutting portion. The groove can form a positive connection in the axial direction with a nose attached on the inner insertion element of a drill shaft portion. Due to the additional positive connection between the drill shaft portion and the cutting portion, the risk of the detachable connection between the drill shaft portion and the cutting portion being unintentionally opened during the removal of a jammed drill bit from the substrate is further reduced.

Sections result between the slit-shaped clearances of the outer insertion element that display an elastic effect. The elastic effect may be adjusted via the number and axial height of the slit-shaped clearances and the length of the outer insertion element. In order to separate the drill shaft portion from the cutting portion, a force is exerted in the axial direction on the face of the outer insertion element with the aid of a tool. Due to the effect of the force, the elastic portion of the outer insertion element is deflected and the positive connection between the nose and the groove can be released.

It is particularly preferred for the groove to be annular in shape and disposed in a plane perpendicular to the axis of rotation. A groove with an annular design disposed at the height of the slit-shaped clearances supports the elastic effect of the portions of the outer insertion element between the slit-shaped clearances.

Exemplary embodiments of the invention will be described in the following with reference to the drawings. The drawings are not necessarily intended to show the exemplary embodiments to scale; rather, the drawings are shown in a schematic and/or slightly distorted manner when it aids understanding to do so. With regard to elaborations on the teachings immediately discernible from the drawings, we refer to the relevant prior art. It should be noted here that numerous modifications and alterations may be made regarding the form and details of an embodiment without deviating from the general concept of the invention. The features of the invention disclosed in the specification, the drawings, and the claims may be considered essential to the refinement of the invention either alone or in any combination. In addition, all combinations of at least two features disclosed in the specification, the drawings, and/or the claims may be considered to fall within the scope of the invention. The general concept of the invention is not limited to the exact form or details of the exemplary embodiment shown and described in the following or limited to an object that would be considered limited in comparison to the object disclosed in the claims. In the case of measurement ranges given, values lying within the ranges named as boundary values should also be considered claimed and usable in any desired manner. For the sake of simplicity, the same reference characters have been used in the following for identical or similar parts or parts with an identical or similar function.

DETAILED DESCRIPTION OF THE DRAWINGS

Figure 1A:
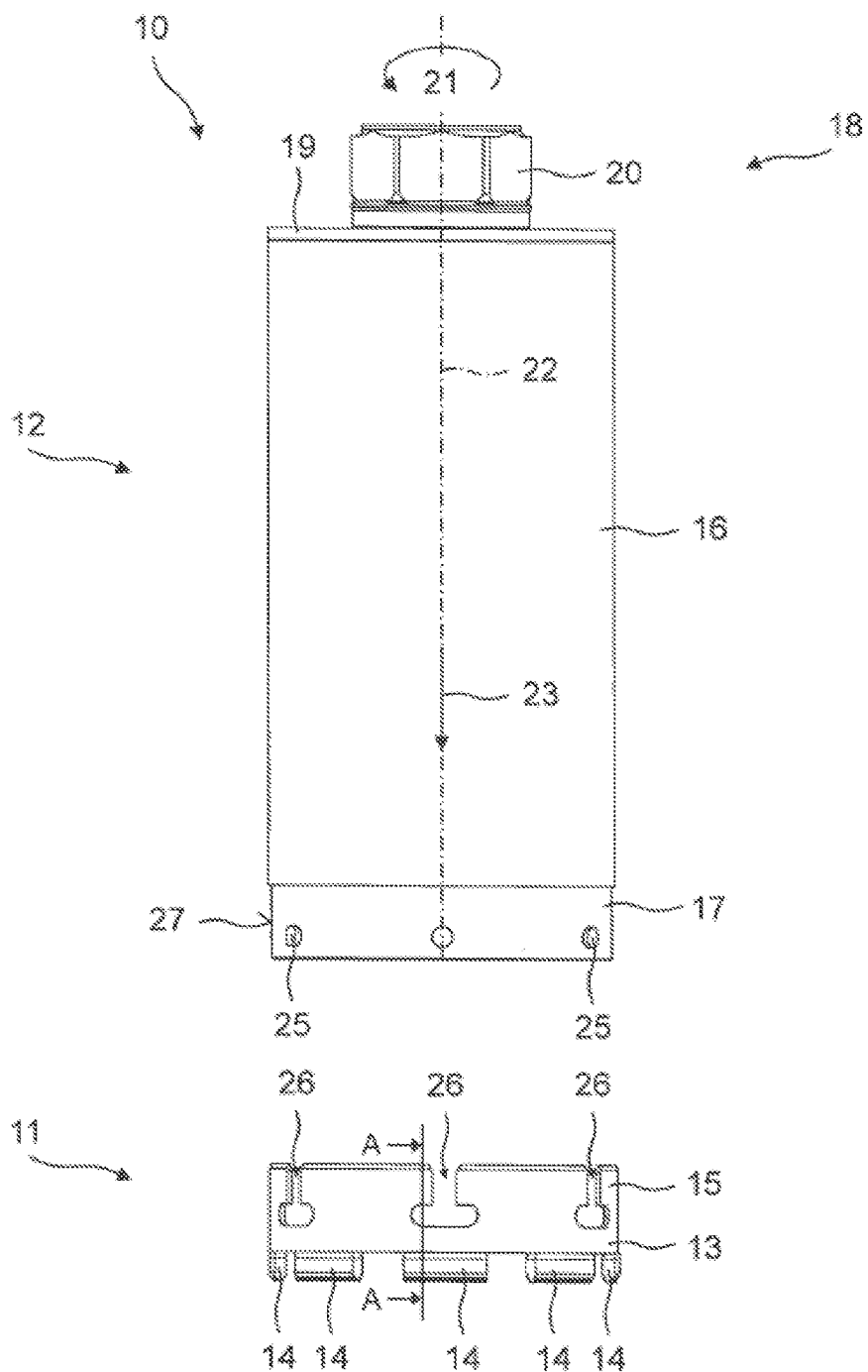
FIGS. 1A, B illustrate a cutting portion according to the invention that may be connected via a removable plug-and-twist connection to a drill shaft portion, in its non-connected state (FIG. 1A) and in its connected state (FIG. 1B)

FIGS. 1A, B show a drill bit 10 comprising a cutting portion 11 according to the invention that may be connected to a drill shaft portion 12 via a removable plug-and-twist connection. FIG. 1A shows the cutting portion 11 and the drill shaft portion 12 in their non-connected state with an open plug-and-twist connection and FIG. 1B shows the cutting portion 11 connected via the plug-and-twist connection to the drill shaft portion 12.

The cutting portion 11 comprises an annular portion 13 that is connected on a first end to a plurality of cutting elements 14 and, on a second end, has a first insertion element 15. Here, the first insertion element is embodied as an outer insertion element 15. The cutting elements 14 are welded, soldered, bolted, or attached in some other suitable fashion to the annular portion 13. The cutting portion 11 may, instead of a plurality of cutting elements 14, also comprise a single cutting element embodied as a cutting sleeve that is connected to the annular portion 13. The cutting portion 11 has a circular cross-section perpendicular to the axis of rotation 22; alternately, cutting portions according to the invention may also have other suitable cross-sections such as, for example, a polygonal cross-section.

The drill shaft portion 12 comprises a cylindrical drill shaft 16 that has a second insertion element 17 on an end facing the cutting portion 11 and is connected to a receiving portion 18 on an end facing away from the cutting portion 11. The second insertion element is designed as an inner insertion, element 17. The receiving portion 18 comprises a cover 19 and an insertion end 20. The drill bit 10 is attached in the tool receptacle of a core drilling device via the insertion end 20. During drilling, the drill bit 10 is driven by the core drilling device in a rotational direction 21 around an axis of rotation 22 and moves in the substrate to be drilled in a drilling direction 23 parallel to the axis of rotation 22. During drilling, the axis of rotation 22 runs coaxially to a longitudinal axis of the drill shaft portion 12 and a longitudinal axis of the cutting portion 11.

Figure 1B:
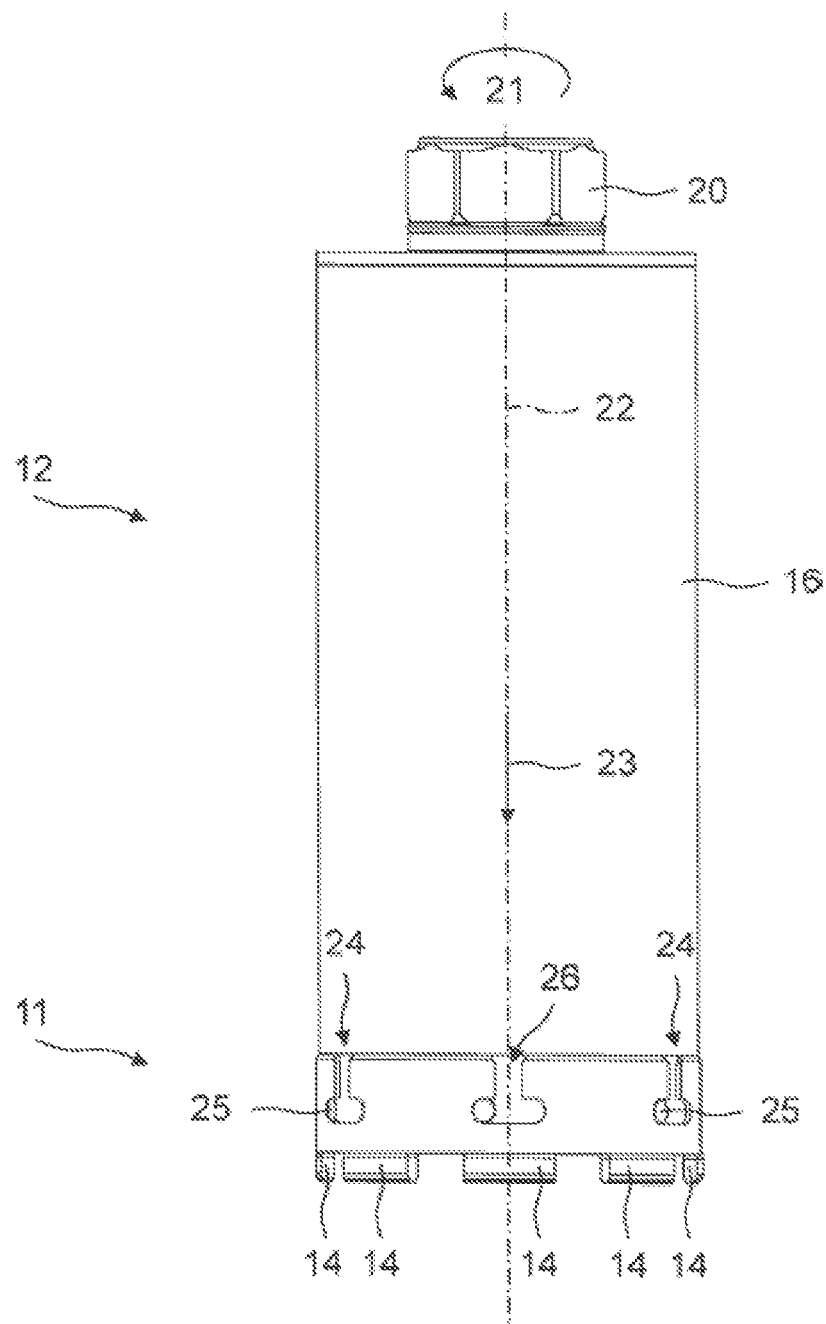

The cutting portion 11 is connected to the drill shaft portion 12 via a plug-and-twist connection 24 (FIG. 1B). The term "plug-and-twist connection" is used to describe connections of two connector elements that form a plug connection in at least one direction, with the inserted connector elements additionally being connected via a twist connection. Here, the plug connection and the twist connection may be closed one after the other or simultaneously.

The cutting portion 11 is placed with the outer insertion element 15 on the inner insertion element 17 of the drill shaft section 12, with the insertion direction of the plug connection running parallel to the axis of rotation 22. The twist connection comprises six pin elements 25 that are inserted into six slit-shaped clearances 26. The six pin elements 25 are attached to the outer side 27 of the inner insertion element 17 and the six slit-shaped clearances 26 are provided in the outer insertion element 15. The pin elements 25 and the clearances 26 are disposed in an evenly distributed fashion around the axis of rotation 22. Due to the even distribution, there is no assignment of specific pin elements 25 to specific clearances 26, and a pin element 25 can be inserted into any clearance 26.

Figure 2A:
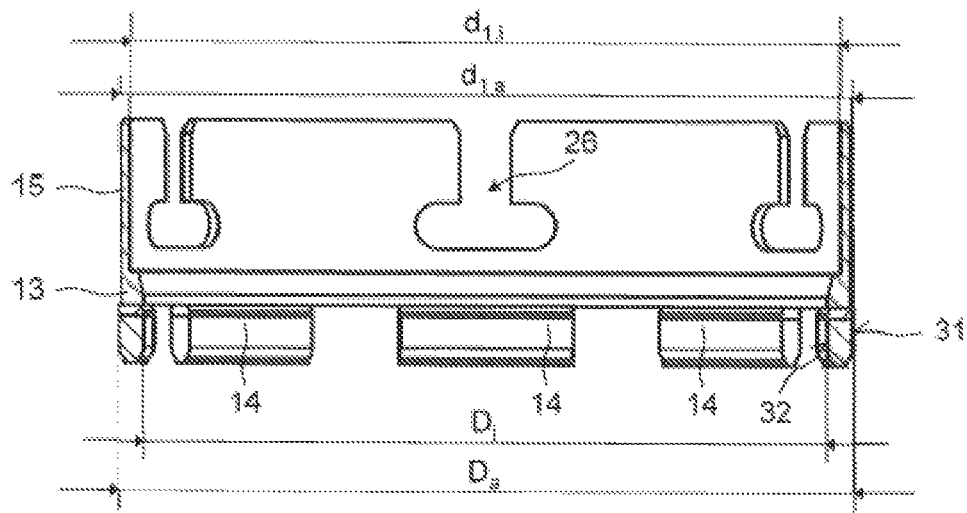
FIGS. 2A, B illustrate the cutting portion in a longitudinal section along the section plane A-A in FIG. 1A (FIG. 2A) and the insertion element of the drill shaft portion in an enlarged view (FIG. 2B)

FIGS. 2A, B show the cutting portion 11 in a longitudinal section parallel to the drawing plane of FIG. 1A. Here, FIG. 2A shows the entire cutting portion 11 and FIG. 2B shows a slit-shaped clearance 26 in the outer insertion element 15 in an enlarged view.

The cutting portion 11 comprises the annular portion 13, the cutting elements 14, and the outer insertion element 15. The annular portion 13 and the outer insertion portion 15 are designed in a monolithic fashion in the embodiment shown here. As an alternative to a monolithic design, the outer insertion element 15 may be designed as a separate part and subsequently connected to the annular portion 13. The cutting elements 14 are disposed in an annular fashion around the annular portion 13 in a plane perpendicular to the axis of rotation 22 and each comprise an outer edge 31 and an inner edge 32. The outer edges 31 of the cutting elements 14 form an outer circle having an outer diameter $D_a$ and the inner edges 42 form an inner circle having an inner diameter $D_i$. The outer insertion element 15 has an outer diameter $d_{1,a}$ and an inner diameter $d_{1,i}$.

Figure 2B:
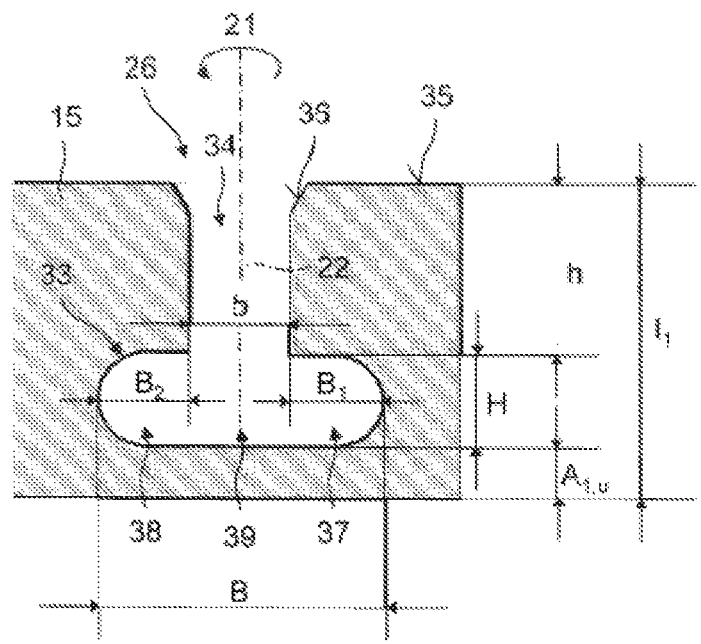

FIG. 2B shows a slit-shaped clearance 26 in the outer insertion element 15 in an enlarged view. The slit-shaped clearance 26 comprises a transverse slit 33 disposed perpendicular to the axis of rotation 22 and a connector slit 34 disposed parallel to the axis of rotation 22. The connector slit 34 connects the transverse slit 33 to an upper edge 35 of the outer insertion element 15, which has an open design on the upper edge 35 in the region of the connector slit 34. The pin elements 25 of the drill shaft portion 12 are inserted into the slit-shaped clearance 26 via the connector slit 34 and, by a rotation around the axis of rotation 22, displaced into the transverse slit 33. The transmission of torque from the pin elements 25 onto the outer insertion element 15 occurs in the transverse slit 33.

The outer insertion element 15 has a length 11 parallel to the axis of rotation 22 and a width $b_1$ (FIG. 3) perpendicular to the longitudinal axis 22. The transverse slit 33 has a width B perpendicular to the longitudinal axis 22 and a height H parallel to the longitudinal axis 22. The connector slit 34 has a width b perpendicular to the longitudinal axis 22 and a height h parallel to the longitudinal axis 22. The width b of the connector slit 34 is greater than the pin diameter of the pin elements 25, such that the pin elements 25 may be easily inserted into the connector slit 34. Here, the insertion of the pin elements 25 may be facilitated by an inclined insertion surface 36 on the upper edge 35. The height h of the connector slit 34 is selected in such a way that the cutting portion 11 is sufficiently able to withstand tensile forces during the removal of a jammed drill bit. If the height h is selected to be too low, the risk is incurred of a deformation of the outer insertion element 15.

The transverse slit 33 has a lower distance $A_{1,u}$ from the annular portion 13 parallel to the longitudinal axis 22 and an upper distance from the upper edge 35, with the upper distance corresponding to the height h of the connector slit 34. The lower distance $A_{1,u}$ from the annular portion 13 is selected in such a way that the cutting portion 11 is sufficiently able to withstand tensile forces exerted by a drill stand. If the lower distance $A_{1,u}$ is selected to be too low, the risk is incurred of a deformation of the outer insertion element 15.

The transverse slit 33 comprises a catching region 37, a locking region 38, and a transitional region 39. The catching region 37 and the locking region 38 are disposed on opposite sides of the connector slit 34 relative to the rotational direction 21 of the cutting portion 11, with the catching and locking regions 37, 38 being connected via the transitional region 39 to the connector slit 34. The catching region 37 is connected to the connector slit 34 on the side of the connector slit 34 facing the rotational direction 21 and the locking region 38 is connected to the connector slit 34 on the side of the connector slit 34 facing away from the rotational direction 21. The transmission of torque from the drill shaft portion 12 onto the cutting portion 11 occurs via the pin elements 25 and the catching region 37. The locking region 38 reduces the risk of the plug-and-twist connection 24 between the drill shaft portion 12 and the cutting portion 11 being inadvertently opened during the removal of a jammed drill bit from the substrate.

The catching region 37 has a width $B_1$ perpendicular to the longitudinal axis 22; the height of the catching region 37 corresponds to the height H of the transverse slit 33. The locking region 38 has a width $B_2$ perpendicular to the longitudinal axis 22; the height of the locking region 38 corresponds to the height H of the transverse slit 33. The widths $B_1$, $B_2$ of the catching region 37 and the locking region 38 are selected in such a way that the pin elements 25 are held in the transverse slit if tensile force is exerted and do not break out.

Figure 3:
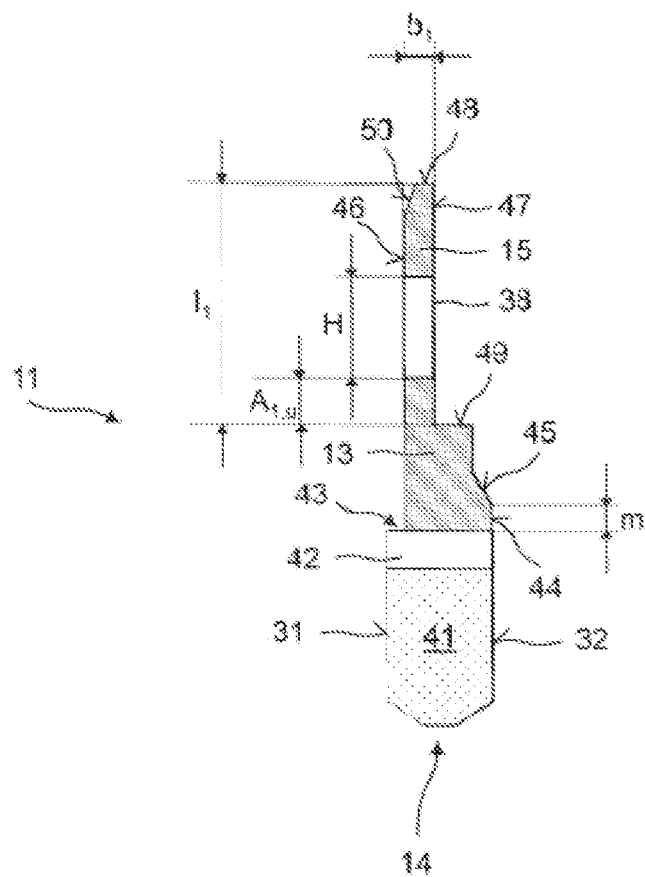
FIG. 3 illustrates the cutting portion in a longitudinal section along the section plane B-B in FIG. 1.
Figure 4:
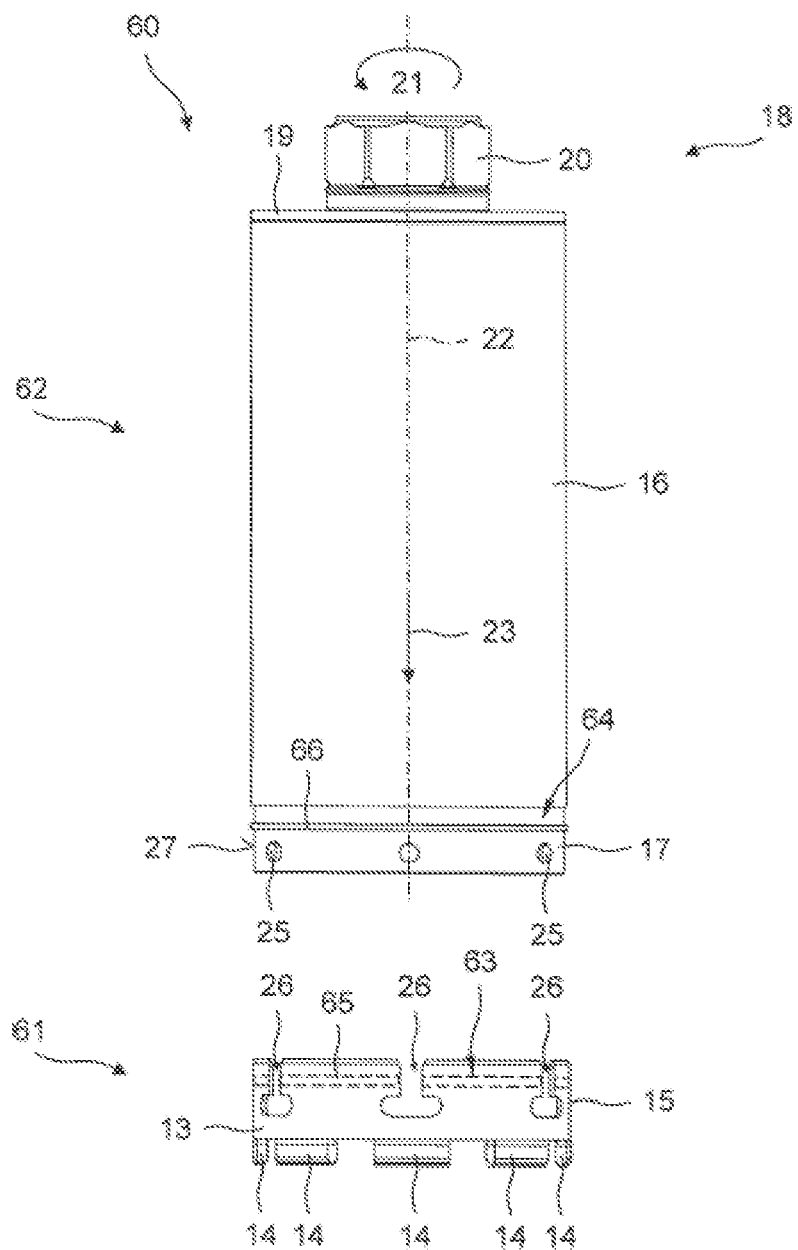
FIG. 4 illustrates an additional embodiment of a cutting portion according to the invention that may be connected to a drill shaft portion via an additional positive connection.

FIG. 3 shows the cutting portion 11 in the longitudinal section along the section plane A-A in FIG. 1A. The cutting portion 11 comprises the annular portion 13, the cutting elements 14, and the outer insertion element 15.

The cutting elements 14 are comprised of a matrix zone 41 and a neutral zone 42, with the matrix zone 41 being composed of a powder material to which cutting particles have been added and with the neutral zone 42 being composed of a weldable powder material with no cutting particles. The two-part structure of the cutting elements 14 is necessary in order to be able to weld the cutting elements 14 to the annular portion 13. The annular portion 13 is located flush against the inner edge 32 of the cutting element 14 and has a rebound 43 relative to the outer edge 31 of the cutting element 14.

The annular portion 13 comprises a guide portion 44 and a core removal portion 45 on its inner side. The core removal portion 45 has an inner diameter that reduces in the direction of the cutting elements 14; the oblique surface of the core removal portion 45 supports the removal of the drill core. The guide portion 44 rests flush against the cutting element 14 and, during drilling, forms a guide for the cutting elements 14; the guide portion 44 has a length m parallel to the axis of rotation 22. As an alternative to the guide on the inside of the drill bit 10, the guide portion may be disposed on the outside or on the outside and inside. The length m of the guide portion 44 is less than 4 mm. A guide portion that is less than 4 mm does not interfere with the supply of a cooling and rinsing medium, or at least does not do so to a substantial degree.

The outer insertion element 15 comprises an outer jacket surface 46, and inner jacket surface 47, and a face 48. An annular limit stop shoulder 49 is located at the transition from the annular portion 13 to the outer insertion element 15. In the cutting portion 11 shown in FIG. 3, the outer insertion element 15 additionally comprises an oblique outer surface 50 whose diameter increases in the direction of the cutting elements 14.

FIG. 5 shows an additional drill bit 60 comprising a cutting portion 61 according to the invention that is connectable via a removable plug-and-twist connection to a drill shaft portion 72. The drill bit 60 differs from the drill bit 10 in that an additional positive connection is provided in the axial direction that hinders an unintentional removal of the cutting portion 61 from the drill shaft portion 62.

In addition to the outer insertion element 15 and the slit-shaped clearances 26, the cutting portion 61 also comprises a first connector unit 63, and the drill shaft portion 62 comprises a second connector unit 64 in addition to the inner insertion element 17 and the pin elements 25. The first connector unit 63 comprises a groove 65 disposed on the inside 47 of the outer insertion element 15. The second connector unit 64 comprises a nose 66 disposed on the inner insertion element 17 and extending radially outward. In the connected state of the drill bit 60, the nose 66 and the groove 65 form a positive connection in the axial direction, i.e., in the drilling direction 23, between the cutting portion 61 and the drill shaft portion 62. The cutting portion 61 is secured by means of the nose 66 and the groove 65 against the drill shaft portion 62 being pulled off of the cutting portion 61.

The nose 66 is disposed in the axial direction between the pin elements 25 and the drill shaft 16. In order to remove the drill shaft portion 62 from the cutting portion 61, a force is exerted on the face of the outer insertion element 15 with the aid of a tool. By the effects of the force, the elastic section of the outer insertion element 15 is deflected and the positive connection between the nose 66 and the groove 65 can be opened. The groove 65 is embodied in an annular fashion and disposed in a plane perpendicular to the axis of rotation 22. A groove with an annular design that is disposed in the axial direction on the level of the slit-shaped clearance is 26 reinforces the elastic effect of the sections of the outer insertion element 15 between the slit-shaped clearances 26.

The retaining force withstood by the nose 66 and the groove 65 can be adapted using the geometry of the nose 66 and the groove 65. Locking the nose 66 into the groove 65 should be as comfortable as possible for the operator; an oblique surface facilitates locking in. The radial height of the nose 66, i.e., its height in the radial direction, the contact surface between the nose 66 and the inner insertion element 17, and the angle of incline, for example, are suitable as geometric parameters for the adjustment of the retaining force.

The invention claimed is:

1. A cutting portion of a drill bit, comprising:
   an annular portion having a first end and a second end;

a cutting element disposed on the first end of the annular portion, wherein the cutting element is connected to the first end of the annular portion; and an insertion element disposed on the second end of the annular portion, wherein the second end faces away from the cutting element and the insertion element is connected to the second end of the annular portion; and an annular limit stop shoulder that is located at a transition from the annular portion to the insertion element;

wherein the insertion element includes a slit-shaped clearance having a transverse slit and a connector slit, wherein the transverse slit is disposed perpendicular to an axis of rotation of the cutting portion and is connected via the connector slit to an upper edge of the insertion element, wherein the insertion element has a lower distance between the transverse slit and the annular limit stop shoulder, the lower distance being parallel to the axis of rotation, and wherein the insertion element includes a groove that is disposed in an axial direction at a level of the slit-shaped clearance.

2. The cutting portion according to claim 1, wherein the insertion element includes one or more additional slit-shaped clearances.

3. The cutting portion according to claim 1, wherein the insertion element has an outer diameter and an inner diameter perpendicular to the axis of rotation and wherein the insertion element extends parallel to the axis of rotation over a length.

4. The cutting portion according to claim 3, wherein the length of the insertion element is at least 18 mm.

5. The cutting portion according to claim 4, wherein the length of the insertion element does not exceed 28 mm.

6. The cutting portion according to claim 1, wherein the transverse slit has a distance from a lower edge of the annular portion of at least 3 mm.

7. The cutting portion according to claim 6, wherein the lower distance does not exceed 5 mm.

8. The cutting portion according to claim 1, wherein the transverse slit includes a catching region and a locking region and wherein the catching region is disposed on a first side of the connector slit and the locking region is disposed on a second side of the connector slit.

9. The cutting portion according to claim 8, wherein a width of the catching region and a width of the locking region are equal.

10. The cutting portion according to claim 8, wherein a width of the catching region is greater than a width of the locking region.

11. The cutting portion according to claim 1, wherein a height of the connector slit parallel to the axis of rotation is at least 10 mm.

12. The cutting portion according to claim 11, wherein the height of the connector slit parallel to the axis of rotation does not exceed 13 mm.

13. The cutting portion according to claim 1, wherein the annular portion includes a guide portion, wherein the guide portion rests flush against an outer edge, an inner edge, or the outer edge and the inner edge of the cutting element parallel to the axis of rotation.

14. The cutting portion according to claim 13, wherein a length of the guide portion parallel to the axis of rotation is less than 4 mm.

15. The cutting portion according to claim 1, wherein the groove is annular and is disposed in a plane perpendicular to the axis of rotation.

* * * * *